US006421237B1

(12) United States Patent
Kim

(10) Patent No.: US 6,421,237 B1
(45) Date of Patent: Jul. 16, 2002

(54) PORTABLE COMPUTERS WITH MULTI-PLATFORM ARCHITECTURE AND METHOD FOR MANUFACTURING THE SAME

(75) Inventor: Dong-Wook Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/417,057

(22) Filed: Oct. 13, 1999

(30) Foreign Application Priority Data

Oct. 13, 1998 (KR) ............................. 98-42808

(51) Int. Cl.[7] ................................ G06F 1/16
(52) U.S. Cl. ................. 361/686; 361/741; 439/928
(58) Field of Search ................. 361/686, 680–683, 361/725–727, 741, 754, 756; 439/67, 77, 945, 928, 928.1; D6/396, 397; D14/100, 114

(56) References Cited

U.S. PATENT DOCUMENTS

| 5,144,302 A | | 9/1992 | Carter et al. ................. 341/20 |
|---|---|---|---|
| 5,666,497 A | * | 9/1997 | Milhaupt et al. ........... 361/686 |
| 5,865,546 A | | 2/1999 | Ganthier et al. ............ 400/489 |
| 5,923,754 A | * | 7/1999 | Angelo et al. ................ 380/4 |
| 5,987,547 A | * | 11/1999 | Panasik et al. ............. 710/102 |
| 6,061,233 A | * | 5/2000 | Jung ........................... 361/686 |
| 6,169,847 B1 | * | 1/2001 | Mizoguchi et al. ......... 386/111 |
| 6,201,693 B1 | * | 3/2001 | Kamimaki et al. ......... 361/686 |

FOREIGN PATENT DOCUMENTS

JP          3-125498         5/1991

* cited by examiner

Primary Examiner—Leo P. Picard
Assistant Examiner—Hung Van Duong
(74) Attorney, Agent, or Firm—Robert E. Bushnell, Esq.

(57) ABSTRACT

According to a method for manufacturing a portable computer, base units and display panels are composed so that electronic devices may be equipped to be identically used and option units whose structures are different are composed. Then, each of the option units is coupled to the base units and the display panels, thereby manufacturing portable computers whose modes are different. This portable computer comprises base units, display panels, and option units. The base units and the display panels are identically used. The option units whose structures are different are coupled to the base units and the display panels, respectively. That is, base units of a portable computer are base housings which are arranged at an identical position and upon which an I/O port, a hard disk drive, a PCMCIA slot, a battery, a DC/DC board, and a memory are mounted. The option units are top housings upon which a keyboard assembly and a pointing device are mounted. Thus, it is possible to manufacture swappable portable computers and non-swappable portable computers by only exchanging an option unit (i.e., top housing).

33 Claims, 5 Drawing Sheets

PORTABLE COMPUTERS WITH MULTI-PLATFORM ARCHITECTURE AND METHOD FOR MANUFACTURING THE SAME

CLAIM OF PRIORITY

This application makes reference to, incorporates the same herein, and claims all rights accruing thereto under 35 U.S.C. §119 through my patent application entitled Portable Computers with Multi-Platform Architecture and Method for Manufacturing the Same earlier filed in the Korean Industrial Property Office on the 13th day of October 1998 and there duly assigned Ser. No. 1998/42808.

FIELD OF THE INVENTION

The present invention relates generally to the field of portable computers and more particularly, to portable computers having multi-platform architecture based on a common platform a method for manufacturing the same.

BACKGROUND OF THE INVENTION

Recent rapid changes in environments employing personal portable computers require continuous improvements in hardware, multiple new functions, and diversification of portable computers. Therefore, a structure of a portable computer should be designed considering production facility and user requirement. Since major portable computer manufacturing companies should provide timely new models having a variety of functions and designs, a period for developing a portable computer should be shortened enough.

An earlier method for manufacturing a portable computer has limitation to satisfaction of the above conditions. For example, although a variety of models should be developed with diversification of functions and designs to meet the requirements of users as short as possible, the conditions are limited by manpower, expenditure, and technical factors. In an earlier method for manufacturing a portable computer, all parts should be respectively developed in each model and manpower and apparatus are simultaneously invested. Consequently, the duration of development becomes long and the manufacturing cost becomes high. Moreover, it is difficult to assure reliability and quality of goods in each of the models. This is because technical problems such as electromagnetic interference (EMI) or heat should be solved whenever each model is developed. Since a variety of models cannot be developed by the earlier method during a short term, manufacturing companies cannot distribute portable computers of various models. Further, since development and production of each model are different, production cost increases and thus price of manufactured goods becomes high.

U.S. Pat. No 5,865,546 for a Modular Keyboard For Use In A Computer System to Ganthier et al discloses a how a wide variety of models of computers can be assembled by placing different modules in different sockets on a keyboard. For example, the user can insert any combination of a keyboard module, trackball module, keypad module, and scanner module on a keyboard assembly to arrive at any one of a variety of computers. However, what is needed is a portable computer and a method of manufacture of said portable computer where many different models of a portable computer can easily be constructed and where each model differs from each other model by the location of and type of module bay receptors, the types of modules each module bay receptor can electronically operate, and the electronic bus structure of each portable computer based on said location and types of module bay receptors and their connections to a motherboard.

SUMMARY OF THE INVENTION

It is an object of the invention to provide a method for manufacturing a portable computer and a portable computer by the method which can manufacture portable computers of various models during a short developing term.

It is another object of the invention to provide a method for manufacturing a portable computer and a portable computer by the method which can manufacture portable computers of various models by investing relatively small expenditure.

It is further an object to provide a portable computer and a method of manufacture of said portable computer that comes in several models, where each model differs from each other based on the location and type of module bay receptors in said portable computer.

It is still further an object to provide a portable computer that has abase portion, atop portion that has a keyboard that fits onto said base portion, and a display portion having a screen that fits onto said top portion, where models of said portable computer are distinguished from one another by the design of the top portion and the location, quantity, and type of module bay receptors in a top portion of a portable computer.

According to a feature of the invention, a method for manufacturing portable computers comprising the steps of composing base units of which electronic devices are located at an identical position, respectively; composing option units having electronic devices of which structures are different each other, wherein the electronic devices of the base units are coupled to that of the option units; composing display panels having a screen and being identically coupled to the option units, respectively; and coupling the base option units to the option units to the display panels, respectively, to thereby complete portable computers having different functions.

In the above embodiment, the step of composing the base units comprises the steps of composing mother boards having an identical layout; composing hard disk drives having an identical coupling structure; composing PCMCIA slots having an identical connector; and composing memories having an identical socket.

According to another feature of the invention, portable computers comprises base housings of which electronic devices are arranged at an identical position, respectively; top housings having different structures and being identically coupled to the base housings, respectively and including electronic devices coupled to the electronic devices of the base housings, respectively; and display panels being identically coupled to the top housings, respectively wherein a screen is mounted upon each of the display panels, to thereby complete portable computers having different functions, respectively.

In the above embodiment, the respective electronic devices of the top housings include a floppy disk drive.

In the above embodiment, the respective electronic devices of the base housing comprise a mother board having an identical layout; an I/O port; a hard disk drive having an identical coupling structure; a battery; a DC/DC board; and a memory having an identical socket.

In the above embodiment, the respective electronic device of the top housings comprises a keyboard assembly and a pointing device.

In the above embodiment, one of the electronic devices of the base housings includes a swappable slot, to thereby exchange a CD-ROM drive with a DVD drive or a ZIP drive.

In the above embodiment, one of the electronic devices of the base housings to which the top housings are coupled includes a swappable slot, to thereby exchange a CD-ROM drive with a DVD drive or a ZIP drive.

Accordingly, portable computers having various models can be designed and manufactured at the same time. If models are different, option units whose functions and design are different are exchanged to design and manufacture the portable computers. Duration and expenditure of development are reduced, thereby to decrease in unit price of products. Portable computers having various models use an identical base unit and a display panel, thereby to assure reliability and quality of products. Further, duration of development is shortened to comply with request of consumers, thereby to provide portable computers of new models.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
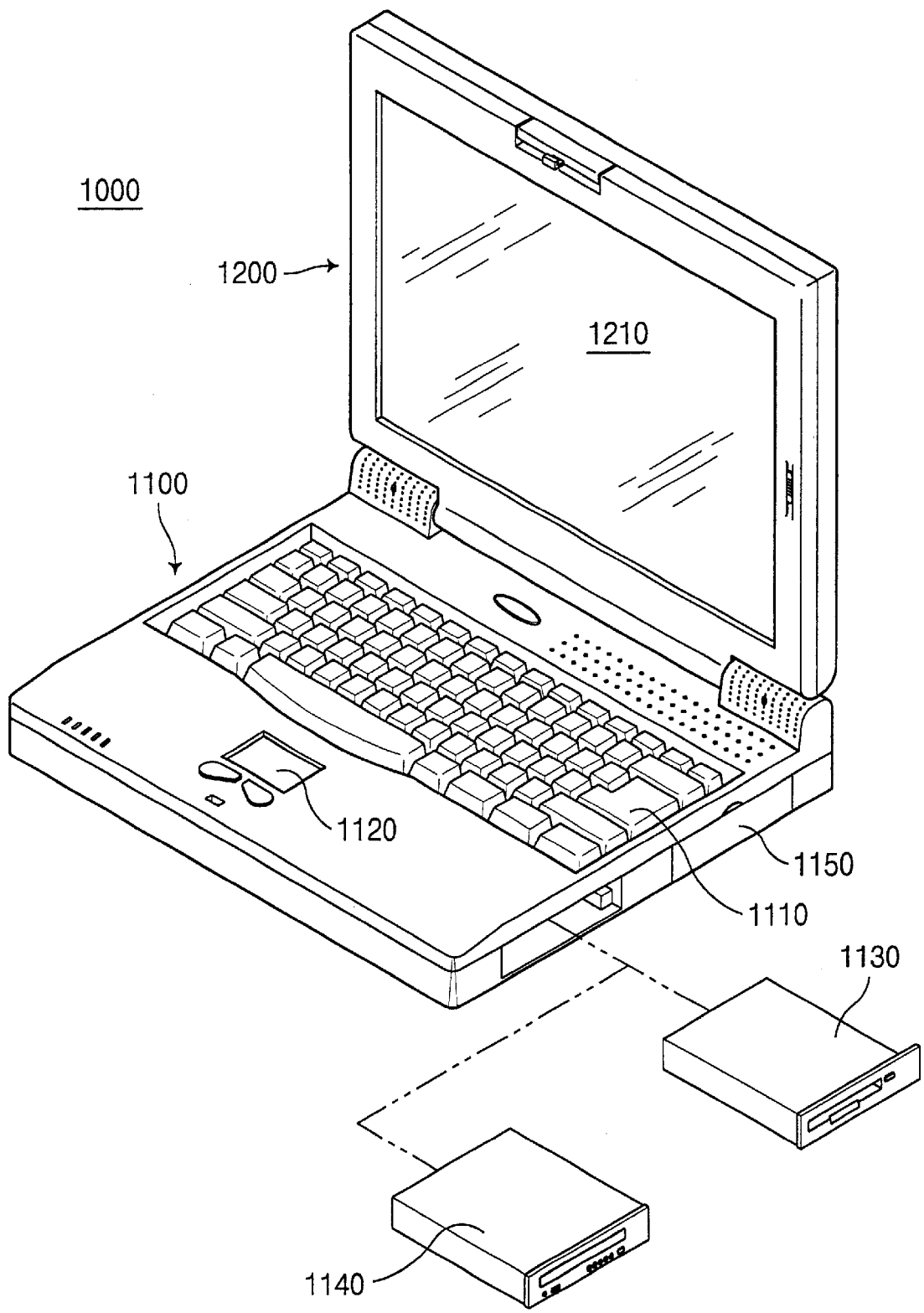
FIG. 1 is a perspective view of an earlier swappable portable computer wherein a floppy disk drive can be exchanged with a CD-ROM drive.
Figure 2:
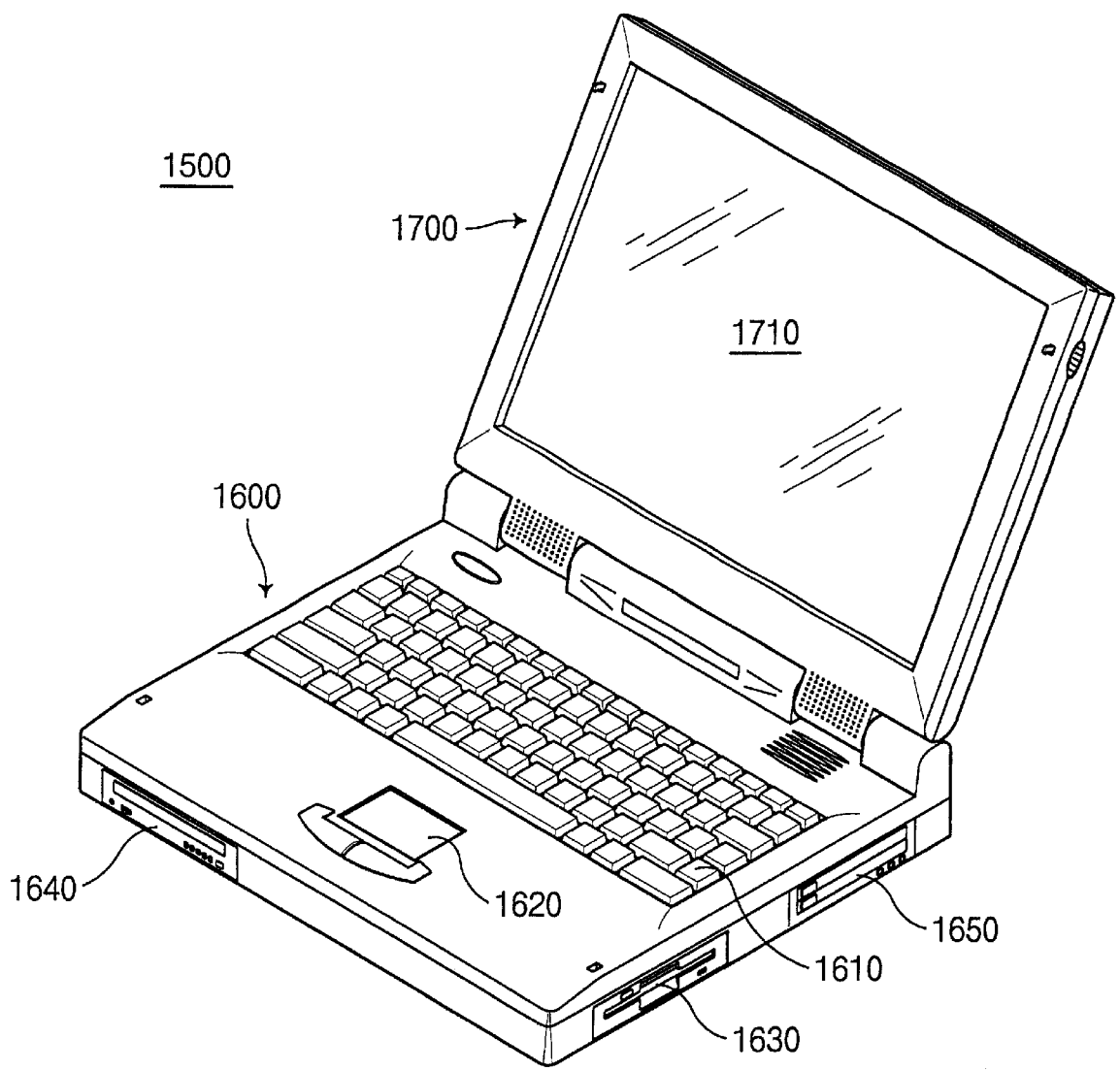
FIG. 2 is a perspective view of an earlier non-swappable portable computer wherein a floppy disk drive and a CD-ROM drive are fixed.

FIG. 1 shows a portable computer 1000 which allows some peripheral devices, e.g., a floppy disk drive (FDD) and a CD-ROM drive, to be swapped. In the portable computer 1000, the other peripheral devices, e.g., a hard disk drive (HDD) and a PCMCIA slot, may be fixed. In contrast, FIG. 2 shows a typical portable computer 1500 having permanently installed peripheral devices, e.g., an FDD, a HDD, a CD-ROM drive, and a PCMCIA slot which cannot be swappable with other devices. Referring to FIGS. 1 and 2, the portable computer 1000 (or 1500) comprises abase 1100 (or 1600) and a panel 1200 (or 1700). The base 1100 (or 1600) is equipped with a keyboard assembly 1110 (or 1610), a pointing device 1120 (or 1620), an HDD (not shown), a FDD 1130 (or 1630), a CD-ROM drive 1140 (or 1640), and a PCMCIA slot 1150 (or 1650). The panel 1200 (or 1700) includes a display 1210 (or 1710). In the swappable portable computer 1000, either the floppy disk drive 1130 or the CD-ROM drive 1140 is installed in a bay. In the portable computer 1500 (so-called "3-spindle" computer or "non-swappable" computer), the floppy disk drive 1630 and the CD-ROM drive 1640 are fixed within the base 1600, together with the HDD and PCMCIA slot.

The earlier portable computers 1000 and 1500 have been designed and manufactured by each portable computer manufacturing company. Although the portable computers 1000 and 1500 use the identical main elements, design to manufacture thereof are different each other. If a variety of portable computer models are to be developed in the earlier manufacture method, each of the models is designed, each part is fabricated by means of each fabrication machine, and the models are combined in each production line.

Figure 3:
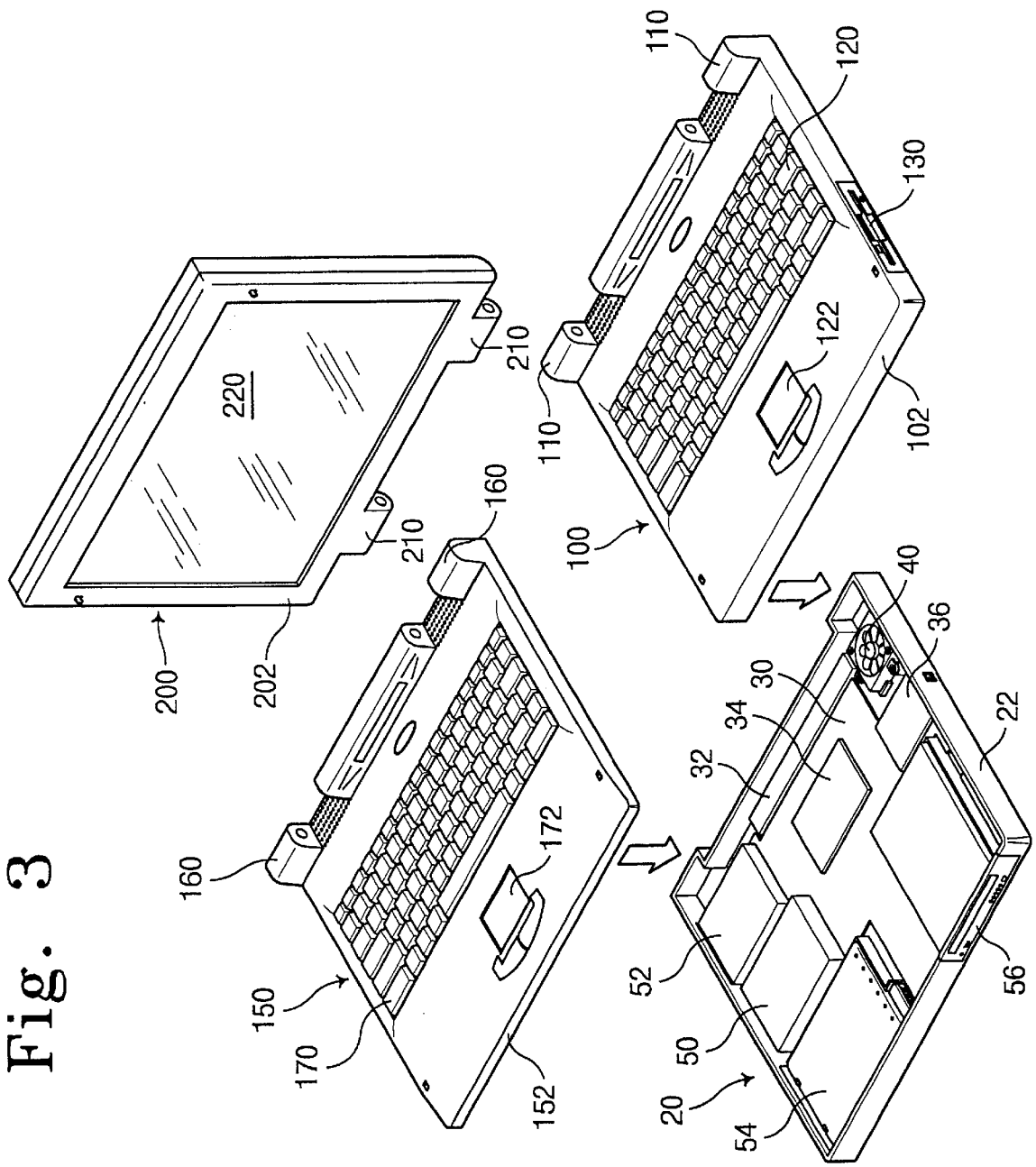
FIG. 3 is an exploded perspective view for explaining a method for manufacturing a portable computer according to an embodiment of the invention.

FIG. 3 is an exploded perspective view for explaining a method for manufacturing a portable computer according to an embodiment of the invention. Referring now to FIG. 3, a portable computer comprises a bottom assembly 20, a panel assembly 200, and top assembly 100 or 150. The bottom assembly 20 is equipped with electronic devices used in common in portable computers whose models are different. The panel assembly 200 is equipped with a display 220. The top assemblies 100 and 150 are equipped with different electronic devices, respectively. Further, design and structure thereof are different, respectively. That is, portable computers whose models are different have different function, structure, and design in accordance with the top housing 100 and 150. The portable computers whose models are different are composed by coupling the bottom assembly 20 and the panel assembly 200 to the top assemblies 100 and 150. The top assemblies 100 and 150 may be composed by the number of portable computer models. For example, in manufacture of three-model-portable computers, three of bottom assemblies and panel assemblies having an identical structure are manufactured, respectively and three top assemblies being different in function and design according to models are manufactured. The preferred embodiment of the invention will refer to two-model-portable computers. Therefore, the top assemblies 100 and 150 will be explained by dividing a first top assembly 100 into a second top assembly 150.

The bottom assembly 20 includes a base housing 22 upon which electronic devices are mounted. Although models of portable computers are different, the electronic devices should be located in an identical position. That is, two of the bottom assemblies 20 used in the first top assembly 100 and the second top assembly 150 have a structure that the identical electronic devices are mounted upon the identical base housing 22 at the identical position. For example, the electronic devices are mother board 30, a DC/DC board 32, a video board 34, a modem board 36, a memory (not shown), a fan 40, an I/O port (not shown), a hard disk drive 50, a PCMCIA slot 52, and battery 54. The electronic devices are arrayed in the identical position, though models of the portable computer are different. The mother board 30 has the identical layout. The hard disk drive 50 has the identical coupling structure to be arranged at the identical position in the base housing 22. The PCMCIA slot 52 has the identical connector. The memory is mounted by the identical socket. Thus, the electronic devices composing the base assembly are arranged at the identical position in the base housing 22 and maintains the identical standard. Different kinds of the video board 34, the memory, and the modem board 36 may be used in accordance with functions required in models of portable computers. For example, the video board 34 may use one of the S3 or the ATI type and the modem board 36 may be exchanged with a LAN board.

A CD-ROM drive 56 may be mounted upon the electronic devices comprising the bottom assembly 20. The CD-ROM drive 56 may be coupled with the bottom housing 22 through swappable slots. This means that a swappable portable computer may be made by means of the bottom assemblies 20. The CD-ROM drive 56 may be exchanged with a DVD drive or a floppy disk drive or a ZIP drive. In a portable computer being mounted with the floppy disk drive, the CD-ROM drive 56 may be exchanged with the DVD drive or the ZIP drive. In all case, a portable computer of this invention is a swappable portable computer.

The first top assembly 100 and the second top assembly 150 compose portable computers whose models are different. A top housing 102 of the first top assembly 100 and a second top housing 152 of the second top assembly 150 have a different structure or design. However, as the first top housing 102 are coupled to the base housing 22, so the second top housing 152 does. Accordingly, the first top housing 102 and the second top housing 152 are coupled to the base housing 22, respectively. The electronic devices being coupled to the first top housing 102 and the second top housing 152 may be different kinds. For example, since the first top housing 102 is higher than the second top housing 152, a first keyboard assembly 120 being mounted upon the first top housing 102 is relatively higher than a second keyboard assembly 170 being mounted upon the second top housing 152. Further, a first touch pad 122 and a second touch pad 172 are mounted upon the first top housing 102 and the second top housing 152, respectively. As a matter of course, the first touch pad 122 and the second touch pad 172 may be different kinds.

Figure 4:
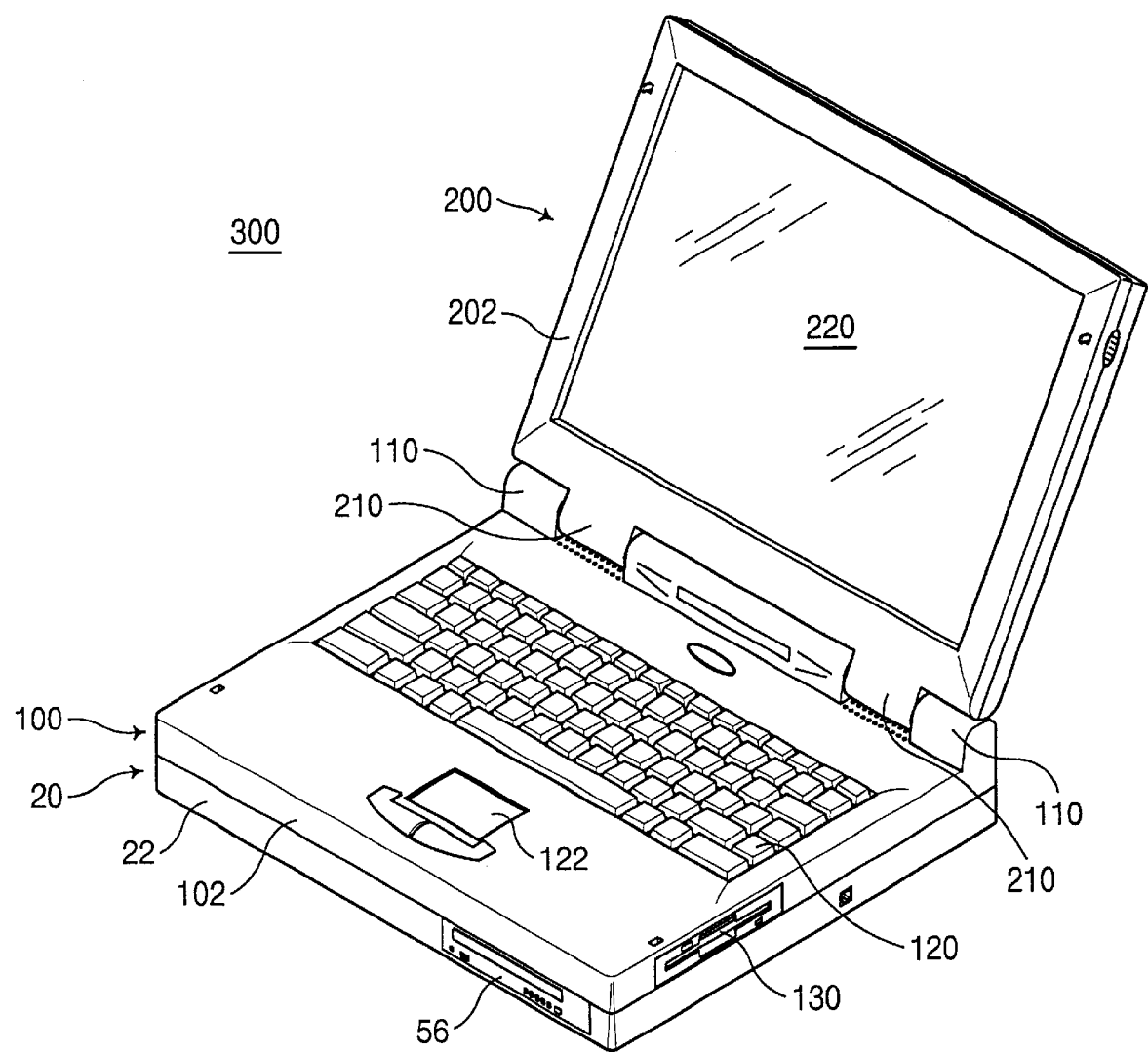
FIG. 4 is a perspective view of a non-swappable portable computer according to the embodiment of the invention.
Figure 5:
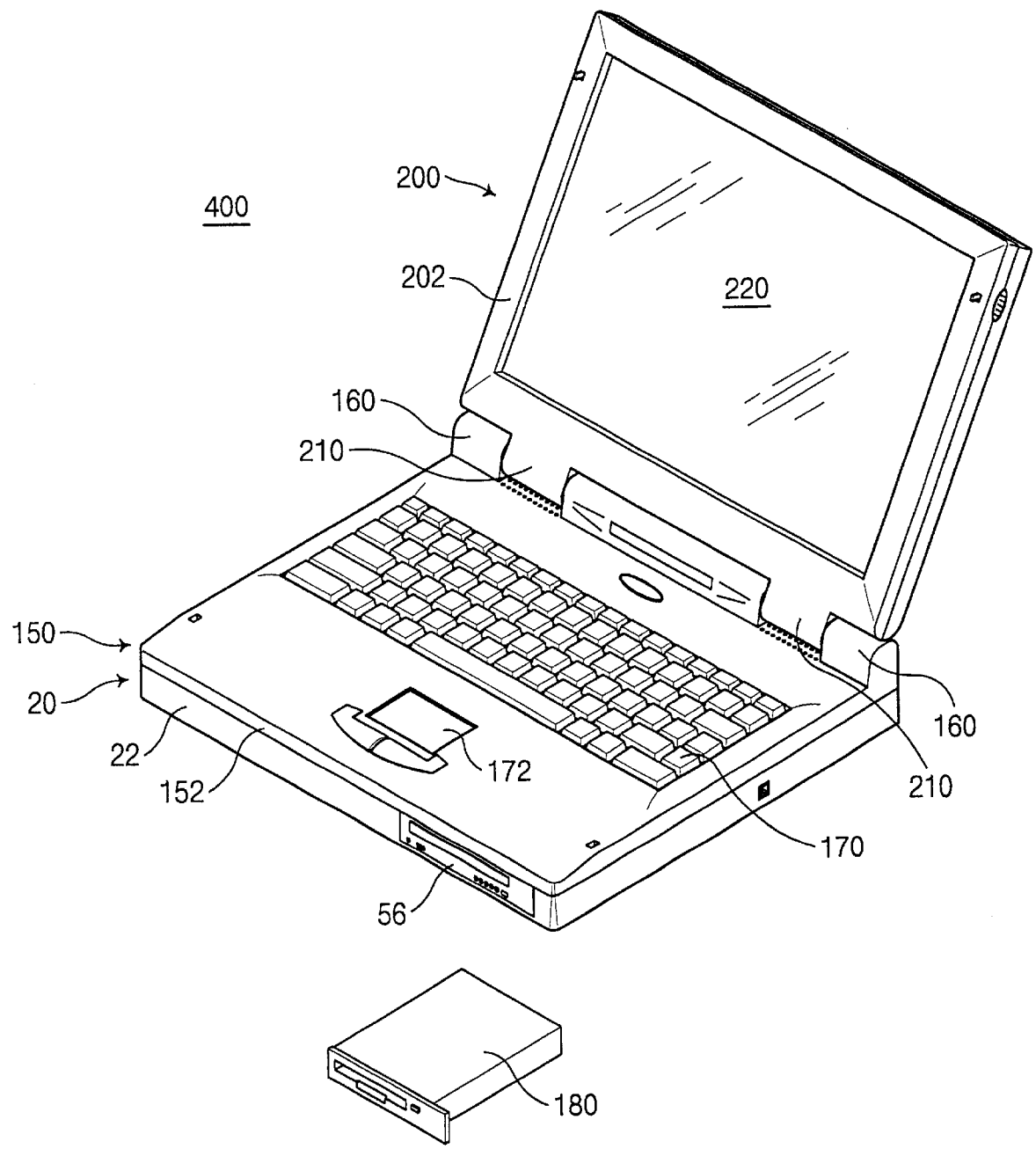
FIG. 5 is a perspective view of a swappable portable computer according to the embodiment of the invention.

The first top assembly is equipped with a floppy disk drive 130. The first top assembly 100 is used so as to manufacture a non-swappable portable computer 300, as shown in FIG. 4. The second top assembly 150 is used so as to manufacture a swappable portable computer 400, as shown in FIG. 5. A floppy disk drive 130 of the non-swappable portable computer 300 is fixed, while the floppy disk drive 180 of the swappable portable computer 400 is exchanged with the CD-ROM drive 56. As a matter of course, the CD-ROM drive 56 of the non-swappable portable computer 300 can be exchanged with a DVD drive or a ZIP drive. That is, a portable computer of this invention is manufactured by merely exchanging top assemblies of portable computers whose models are different.

Top hinges 110 and 160 are made at the back of the first top housing 102 and the second top housing 152, respectively. A structure of the top hinges 110 is identical to that of the top hinge 160. This aims at use of a panel assembly 200 in common. The panel assembly 200 comprises a display 220 and electronic devices (not shown) such as an interface board in a panel housing 202. Under the panel housing 202, a panel hinge 210 is coupled to the top hinges 110 and 160.

Accordingly, portable computers whose models are different can be simply fabricated. In spite of two models in the preferred embodiment of the invention, portable computers of various models can be fabricated.

In the present invention, portable computers of various models can be designed and fabricated at the same time by swapping an option unit (i.e., top assembly) having different function or design. Duration and expenditure of development are reduced, thereby to decrease in unit price of products. Portable computers having various models use an identical base unit (bottom assembly) and a display panel (panel assembly), thereby to assure reliability and quality of products. Further, duration of development is shortened to comply with request of consumers, thereby to provide portable computers of new models.

What is claimed is:

1. A method for manufacturing a first plurality of portable computers that come in a second plurality of models, comprising the steps of:

assembling a first plurality of base units, each of said first plurality of base units having a third plurality of electronic devices, each of said third plurality of electronic devices being located at corresponding identical locations on each of said first plurality of base units making each one of said first plurality of base units identical to each other;

assembling a first plurality of top assemblies, each of said first plurality of top assemblies having a plurality of electronic devices, wherein a varied arrangement of said plurality of electronic devices on said first plurality of top assemblies results in a second plurality of varieties of top assemblies, wherein each one of said second plurality of varieties of top assemblies differ from each other, wherein top assemblies of the same variety are identical to each other, wherein when one of said first plurality of base units is coupled to one of said first plurality of said top assemblies, said third plurality of electronic devices of said base unit match up and become attached with said plurality of electronic devices in said top assembly;

assembling a first plurality of display panels, each one of said first plurality of display panels having a screen, each one of said first plurality of display panels being identically coupled to a corresponding one of said first plurality of top assemblies, each one of said first plurality of display panels being identical to each other; and coupling each one of said first plurality of base units to corresponding ones of said first plurality of top assemblies and coupling each one of said first plurality of said top assemblies to corresponding ones of said first plurality of display panels, resulting in a first plurality of portable computers having a second plurality of models of portable computers.

2. The method of claim 1, wherein the step of assembling said first plurality of base units comprises the steps of:

assembling each of a first plurality of mother boards to corresponding ones of said first plurality of base units;

assembling each of a first plurality of hard disk drives to corresponding ones of said first plurality of base units;

assembling each of a first plurality of PCMCIA slots to corresponding ones of said first plurality of base units; and assembling each of a first plurality of memories, each having an identical socket, to corresponding ones of said first plurality of base units.

3. The method of claim 1, wherein any of said second plurality of varieties of top assemblies includes any of a floppy disk drive, hard disk drive, CD-ROM drive, DVD drive, ZIP drive, DC/DC board, I/O port, and PCMCIA slot, and, alternatively any of said second plurality of varieties of top assemblies is without any of said floppy disk drive, hard disk drive, CD-ROM drive, DVD drive, ZIP drive, DC/DC board, I/O port, and PCMCIA slot.

4. The method of claim 1, wherein any of said second plurality of varieties of top assemblies comprise a combination of a floppy disk drive, a hard disk drive, a CD-ROM drive, a DVD drive, a ZIP drive, a DC/DC board, a I/O port, and a PCMCIA slot.

5. The method of manufacturing of claim 1, wherein some of said second plurality of varieties of top assemblies are thick and comprise a floppy disk drive bay and wherein others of said second plurality of varieties of top assemblies are thin and absent a floppy disk drive bay.

6. The method of claim 1, wherein said first plurality of base units comprise a bay accommodating a floppy disk drive, a hard disk drive, CD-ROM drive, DVD drive, ZIP drive, DC/DC board, I/O port, and PCMCIA slot.

7. The method of claim 2, wherein one of said second plurality of varieties of top assemblies are in the absence of a floppy disk drive, a hard disk drive, a CD-ROM drive, a DVD drive, a ZIP drive, a DC/DC board, a I/O port, and a PCMCIA slot.

8. The method of claim 2, wherein any of said second plurality of varieties of top assemblies includes one of a floppy disk drive, a hard disk drive, a CD-ROM drive, a DVD drive, a ZIP drive, a DC/DC board, a I/O port, and a PCMCIA slot.

9. The method of claim 2, wherein any of said second plurality of varieties of top assemblies include a combination of a floppy disk drive, a hard disk drive, a CD-ROM drive, a DVD drive, a ZIP drive, a DC/DC board, a I/O port, and a PCMCIA slot.

10. The method of claim 5, wherein the step of assembling said first plurality of base units comprises the steps of:
   assembling each of a first plurality of mother boards to corresponding ones of said first plurality of base units;
   assembling each of a first plurality of hard disk drives to corresponding ones of said first plurality of base units;
   assembling each of a first plurality of PCMCIA slots to corresponding ones of said first plurality of base units; and
   assembling each of a first plurality of memories, each having an identical socket, to corresponding ones of said first plurality of base units.

11. The method of claim 5, wherein said first plurality of base units comprise a bay accommodating a hard disk drive, CD-ROM drive, DVD drive, ZIP drive, DC/DC board, I/O port, and PCMCIA slot.

12. A first plurality of portable computers comprising a second plurality of models, comprising:
   a first plurality of base housings each being identical to each other;
   a first plurality of top housings being coupled to said first plurality of base housings, said first plurality of top housings comprising a second plurality of varieties, each one of said second plurality of varieties of top housings being different from each other, each one of said first plurality of top housings being coupled to corresponding ones of said first plurality of base housings; and
   a first plurality of display panels, each of said first plurality of display panels being identical to each other, each one of said first plurality of display panels being coupled to corresponding ones of said first plurality of top housings.

13. The first plurality of portable computers of claim 12 one variety of said first plurality of top housings comprises a floppy disk drive.

14. The first plurality of portable computers of claim 12, one variety of said first plurality of top housings comprises a hard disk drive.

15. The first plurality of portable computers of claim 12 one variety of said first plurality of top housings comprises a CD-ROM drive.

16. The first plurality of portable computers of claim 12, one variety of said first plurality of top housings comprises a DVD drive.

17. The first plurality of portable computers of claim 12, one variety of said first plurality of top housings comprises a ZIP drive.

18. The first plurality of portable computers of claim 12, one variety of said first plurality of top housings comprises a PCMCIA slot.

19. The first plurality of portable computers of claim 12, said first plurality of base housings each comprise:
   a mother board having an identical layout;
   an I/O port;
   a hard disk drive having an identical coupling structure;
   a battery;
   a DC/DC board; and
   a memory having an identical socket.

20. The first plurality of portable computers of claim 12, said first plurality of portable computers being manufactured by a process comprising the steps of:
   assembling said first plurality of base housings, each of said first plurality of base housings having a third plurality of electronic devices, each of said third plurality of electronic devices being located at corresponding identical locations on each of said first plurality of base housings making each one of said first plurality of base housings identical to each other;
   assembling said first plurality of top housings, each of said first plurality of top housings having a variable amount of electronic devices thereon, a varied arrangement of said variable amount of electronic devices on said first plurality of top housings resulting in said second plurality of varieties of top housings, top housings of the same variety being identical to each other, when one of said first plurality of base housings is coupled to one of said first plurality of said top housings, said third plurality of electronic devices of said base housing match up and become attached with said variable amount of electronic devices in said top housing;
   assembling said first plurality of display panels, each one of said first plurality of display panels having a screen, each one of said first plurality of display panels being identically coupled to a corresponding one of said first plurality of top housings; and
   coupling each one of said first plurality of base housings to corresponding ones of said first plurality of top housings and coupling each one of said first plurality of said top housings to corresponding ones of said first plurality of display panels, resulting in a first plurality of portable computers having a second plurality of models of portable computers.

21. The first plurality of portable computers of claim 12, the process of manufacturing comprising the steps of:
   manufacturing said first plurality of base housings for said first plurality of portable computers, each one of said first plurality of base housings being identical to each other;
   manufacturing said first plurality of panel assemblies for said first plurality of portable computers, each one of said first plurality of panel assemblies being identical to each other, each one of said first plurality of panel assemblies having a display;
   manufacturing said first plurality of top housings for said first plurality of portable computers, each one of said first plurality of top housings having a keyboard;
   attaching each one of said first plurality of top housings to corresponding ones of said first plurality of base housings; and
   attaching each one of said first plurality of panel assemblies to corresponding ones of said first plurality of top housings, wherein said step of attaching each one of said first plurality of panel assemblies to corresponding ones of said first plurality of top housings is identical for each of said first plurality of portable computers, resulting in a first plurality of portable computers having a second plurality of varieties of top housings.

22. The first plurality of portable computers of claim 13, said first plurality of base housings each comprise a swappable slot, for exchanging a CD-ROM drive with a DVD drive or a ZIP drive.

23. The first plurality of portable computers of claim 14, said first plurality of base housings each comprise a swappable slot, for exchanging a CD-ROM drive with a DVD drive or a ZIP drive.

24. The first plurality of portable computers of claim 18, said first plurality of base housings each comprise a swappable slot, for exchanging a CD-ROM drive with a DVD drive or a ZIP drive.

25. The first plurality of portable computers of claim 20, wherein said step of assembling said first plurality of base housings comprises the steps of:

assembling each of a first plurality of mother boards to corresponding ones of said first plurality of base housings;

assembling each of a first plurality of hard disk drives to corresponding ones of said first plurality of base housings;

assembling each of a first plurality of PCMCIA slots to corresponding ones of said first plurality of base housings; and assembling each of a first plurality of memories, each having an identical socket, to corresponding ones of said first plurality of base housings.

26. A method of manufacturing a first plurality of models of notebook computers, comprising the steps of:

manufacturing a second plurality of base assemblies for said notebook computers, each one of said second plurality of base assemblies being identical to each other;

manufacturing a second plurality of panel assemblies for said notebook computers, each one of said second plurality of panel assemblies being identical to each other, each one of said second plurality of panel assemblies having a display;

manufacturing a second plurality of top assemblies for said notebook computers, each one of said second plurality of top assemblies having a keyboard;

attaching each one of said second plurality of top assemblies to corresponding ones of said second plurality of base assemblies; and attaching each one of said second plurality of panel assemblies to corresponding ones of said second plurality of top assemblies, wherein said step of attaching each one of said second plurality of panel assemblies to corresponding ones of said second plurality of top assemblies is identical for each of said second plurality of notebook computers, resulting in a second plurality of notebook computers having a first plurality of varieties of top assemblies.

27. The method of manufacturing of claim 26, a fraction of said second plurality of varieties of top assemblies is thicker than a remainder of said second plurality of varieties of said top assemblies.

28. The method of manufacturing of claim 27, wherein said thicker varieties of top assemblies comprise at least one of a floppy disk drive, a hard disk drive, a CD-ROM drive, a DVD drive, a ZIP drive, a DC/DC board, a I/O port, and a PCMCIA slot.

29. The method of manufacturing of claim 27, wherein said remainder of said second plurality of varieties of top assemblies are absent of a floppy disk drive, a hard disk drive, a CD-ROM drive, a DVD drive, a ZIP drive, a DC/DC board, a I/O port, and a PCMCIA slot.

30. The method of manufacturing of claim 27, wherein said step of attaching each one of said first plurality of base assemblies to corresponding ones of said first plurality of top assemblies is identical for each of said first plurality of notebook computers.

31. A first plurality of computers, said first plurality of computers comprising a second plurality of models of computers, said first plurality of computers comprising:

a base housing having a second plurality of electronic devices arranged therein;

a top housing being coupled to said base housing, said top housing having a third plurality of electronic devices coupled to said second plurality of electronic devices of said base housing; and a display panel coupled to said top housings, wherein a screen is mounted upon each of said display panels, wherein each base housing and each display panel of said first plurality of computers are identical.

32. The first plurality of computers of claim 31, wherein some of said second plurality of models of said first plurality of computers comprise a thick top housing comprising a floppy disk drive -bay while others of said second plurality of models of said first plurality of computers have a thin housing absent a floppy disk drive bay.

33. The first plurality of computers of claim 32, wherein each of said first plurality of base housings has a bay that can accommodate hard disk drive, CD-ROM drive, DVD drive, ZIP drive, DC/DC board, I/O port, and PCMCIA slot.

* * * * *